(12) United States Patent
Rainov et al.

(10) Patent No.: US 10,270,497 B2
(45) Date of Patent: Apr. 23, 2019

(54) MODULAR AND SCALABLE CIRCUIT ARCHITECTURE FOR MASSIVE MIMO APPLICATIONS

(71) Applicant: Maxlinear Asia Singapore Private Limited, Singapore (SG)

(72) Inventors: Roman Rainov, Petah Tikva (IL); Ran Soffer, Tel-Mond (IL); Uri Kanari, Herzliya (IL); Nati Mizrahi, Giv'ataim (IL); Kobi Sturkovich, Netanya (IL); Moche Cohen, Pardes Hanna (IL); Eran Ridel, Rosh Ha'aiyn (IL)

(73) Assignee: MAXLINEAR ASIA SINGAPORE PTE LTD, Singapore (SG)

( * ) Notice: Subject to any disclaimer, the term of this patent is extended or adjusted under 35 U.S.C. 154(b) by 113 days.

(21) Appl. No.: 15/213,854

(22) Filed: Jul. 19, 2016

(65) Prior Publication Data

US 2017/0302426 A1    Oct. 19, 2017

Related U.S. Application Data

(60) Provisional application No. 62/324,737, filed on Apr. 19, 2016.

(51) Int. Cl.
| | | |
|---|---|---|
| *H04B 1/38* | (2015.01) | |
| *H04B 7/04* | (2017.01) | |
| *H04J 11/00* | (2006.01) | |
| *H04B 7/0452* | (2017.01) | |
| *H04B 7/06* | (2006.01) | |
| *H04W 88/08* | (2009.01) | |

(52) U.S. Cl.
CPC ............ *H04B 7/04* (2013.01); *H04J 11/0026* (2013.01); *H04B 7/0452* (2013.01); *H04B 7/0617* (2013.01); *H04W 88/08* (2013.01)

(58) Field of Classification Search
CPC ...... H04B 7/04; H04B 7/0452; H04B 7/0617; H04W 88/08; H04J 11/0026
See application file for complete search history.

(56) References Cited

U.S. PATENT DOCUMENTS

| | | | | |
|---|---|---|---|---|
| 2011/0080972 | A1* | 4/2011 | Xi | H04B 7/0617 |
| | | | | 375/267 |
| 2015/0124688 | A1* | 5/2015 | Xu | H04B 7/0452 |
| | | | | 370/312 |
| 2016/0080051 | A1* | 3/2016 | Sajadieh | H04B 7/0456 |
| | | | | 375/267 |
| 2016/0094318 | A1* | 3/2016 | Shattil | H04B 7/026 |
| | | | | 375/267 |

* cited by examiner

*Primary Examiner* — Xin Jia
(74) *Attorney, Agent, or Firm* — McAndrews, Held & Malloy, Ltd.

(57) ABSTRACT

The present disclosure is directed to a modular and scalable front-end architecture for a massive MIMO communication device, such as a base station. The front-end architecture can allow for the number of antennas at the communication device to be increased or decreased in a simple and cost efficient manner. The front-end architecture can also allow for the number of data streams that can be transmitted and/or received by the communication device to be increased or decreased in a simple and cost efficient manner.

8 Claims, 8 Drawing Sheets

MODULAR AND SCALABLE CIRCUIT ARCHITECTURE FOR MASSIVE MIMO APPLICATIONS

CROSS REFERENCE TO RELATED APPLICATIONS

This application claims the benefit of U.S. Provisional Patent Application No. 62/324,737, filed Apr. 19, 2016, which is incorporated by reference herein.

TECHNICAL FIELD

This application relates generally to a cellular communication system that uses a large number of antennas.

BACKGROUND

In a cellular communication system, multiple antennas at a base station (BS) and multiple antennas at one or more user terminals (UTs) served by the BS allow two or more independent data streams to be transmitted from the BS to the UT(s) over the same time-frequency interval. The specific transmission technique that makes this possible is referred to as spatial multiplexing. In general, spatial multiplexing is a multiple-input, multiple-output (MIMO) transmission technique that uses the different "paths" or channels that exist between the multiple antennas at the BS and the multiple antennas at the one or more UTs to spatially multiplex the independent data streams over the same time-frequency interval. When one UT is served two or more independent data streams by the BS over the same time-frequency interval, the system is said to be performing single-user MIMO (SU-MIMO), and when multiple UTs are each served one or more independent data streams by the BS over the same time-frequency interval, the system is said to be performing multi-user MIMO (MU-MIMO).

The number of independent data streams that can be transmitted over the same time-frequency interval can be shown to be limited by the lesser of the number of antennas at the BS and the total number of antennas at the one or more UTs. A further limitation on the number of independent data streams that can be transmitted over the same time-frequency interval results from interference between the independent data streams or what is referred to as inter-user interference in the MU-MIMO context.

In T. L. Marzetta, "Noncooperative Cellular Wireless with Unlimited Numbers of Base Station Antennas," *IEEE Transactions on Wireless Communications*, vol. 9, no. 11, pp. 3590-3600, November 2010 [Marzetta], a concept referred to as "massive MIMO" was introduced. In general terms, massive MIMO refers to a communication system that has a large number of antennas available at the BS (e.g., 16, 32, or more). The large number antennas are used to reduce inter-user interference by further focusing the energy of each independent data stream into ever-narrower regions of space. This is done by appropriately shaping the independent data streams so that the wave fronts emitted by the available antennas for each of the independent data streams add up constructively at the location of the UT intended to receive the independent data stream and/or destructively everywhere else (or at least everywhere else where another UT is intended to receive a different independent data stream over the same time-frequency interval). The process of shaping the independent data streams at the BS is known as transmit precoding.

Despite the benefits of implementing a massive MIMO base station in terms of reduced inter-user interference, the architecture for such a base station remains highly complex and cost prohibitive. The complexity and cost can be attributed, at least in part, to the lack of a modular and scalable massive MIMO architecture, where scalability refers to the ability to increase or decrease the number of independent data streams that can be transmitted/received and/or the number of antennas that can be used to transmit/receive independent data streams by the massive MIMO architecture.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. Overview

As described above, to further reduce inter-user interference when performing spatial multiplexing, a BS can be implemented as a massive MIMO base station. However, the architecture for such a base station remains highly complex and cost prohibitive. The complexity and cost can be attributed, at least in part, to the lack of a modular and scalable massive MIMO architecture, where scalability refers to the ability to increase or decrease the number of independent data streams that can be transmitted/received and/or the number of antennas that can be used to transmit/receive independent data streams by the massive MIMO architecture.

Accordingly, the present disclosure is directed to a modular and scalable front-end architecture for a massive MIMO communication device, such as a BS. In one embodiment, the front-end architecture allows for the number of antennas at the communication device to be increased or decreased in a simple and cost efficient manner. In another embodiment, the front-end architecture allows for the number of data streams that can be transmitted and/or received by the communication device to be increased or decreased in a simple and cost efficient manner. These and other features of the present disclosure are described further below.

II. Exemplary Operating Environment

Figure 1:
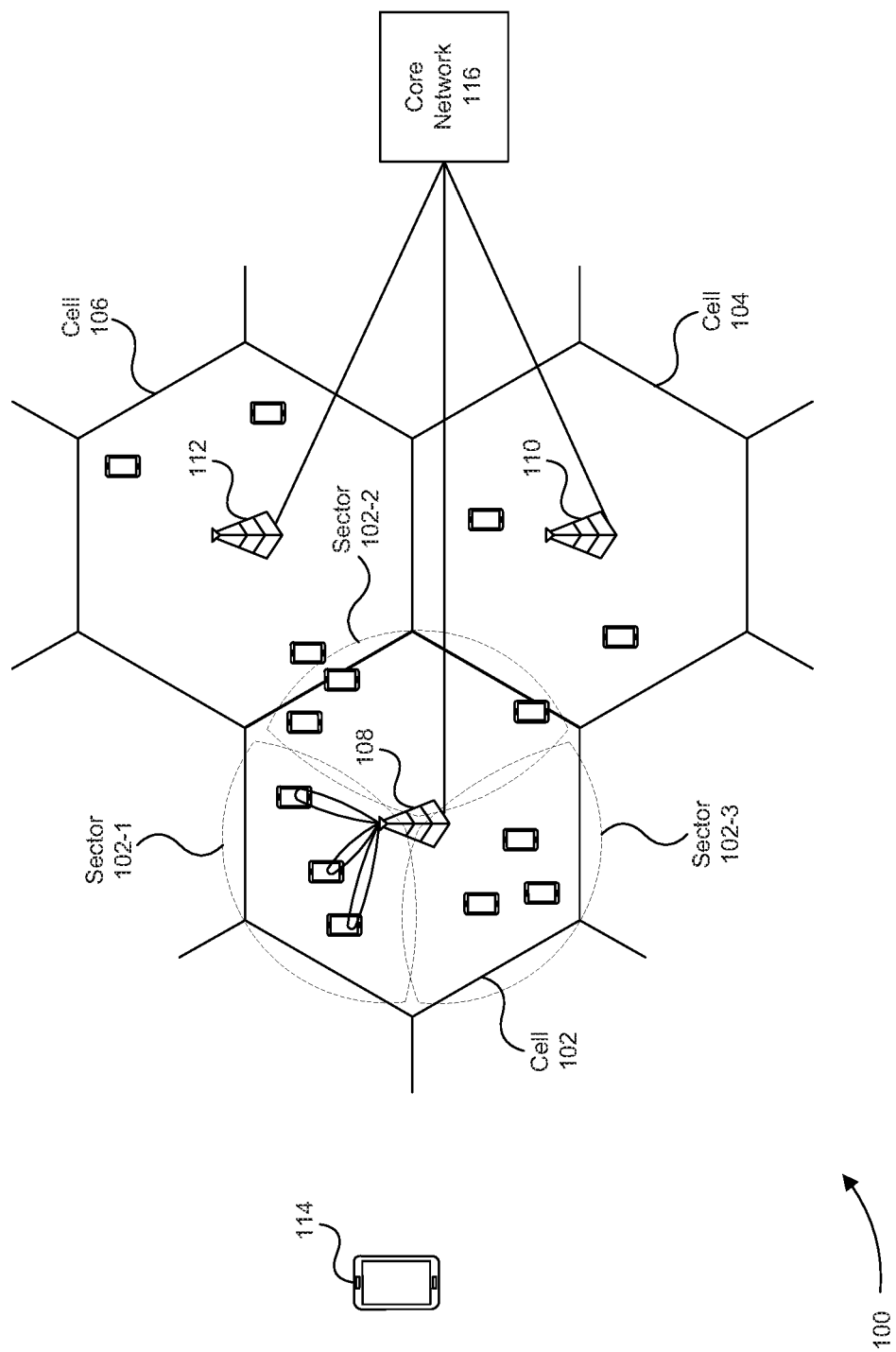
FIG. 1 illustrates an exemplary cellular network in which embodiments of the present disclosure can be implemented.

FIG. 1 illustrates an exemplary cellular network 100 in which embodiments of the present disclosure can be implemented. Cellular network 100 is divided up into cells 102-106 that are each served by a respective base station (BS) 108-112. Each cell 102-106 can, in-turn, be further divided up into sectors. For example, as shown in FIG. 1, cell 102 is divided up into three sectors 102-1, 102-2, and 102-3. Cells 102-106 and their associated sectors are geographically joined together to enable user terminals (UTs) 114 (e.g., mobile phones, laptops, tablets, pagers, or any other device with an appropriate cellular modem) to wirelessly communicate over a wide area with a core network 116 via BSs 108-112. Cellular network 100 can be operated in accordance with any one of a number of different cellular network standards, including one of the current or yet to be released versions of the long-term evolution (LTE) standard and the worldwide interoperability for microwave access (WiMAX) standard.

For at least sector 102-1, BS 108 has a large number of antennas (e.g., 16, 32, or more) available to transmit independent data streams over the same time-frequency interval to one or more UTs 114 located in sector 102-1. BS 108 is configured to use the large number of antennas in conjunction with transmit precoding to appropriately shape the independent data streams before they are transmitted to reduce interference between the independent data streams. The large number of antennas and transmit precoding are specifically used to further focus the energy of each independent data stream into narrower regions of space in accordance with the concept of massive MIMO. In at least one embodiment, the narrow beams are respectively focused in the general direction of their intended UT receiver as shown in FIG. 1.

BS 108 can also (or alternatively) use the large number of antennas available at BS 108 to receive independent data streams over the same time-frequency interval from one or more UTs 114 located in sector 102-1. In such an instance, BS 108 is configured to use the large number antennas in conjunction with receive precoding to appropriately weight and combine the signals received by each antenna to reduce interference between the independent data streams.

Figure 2:
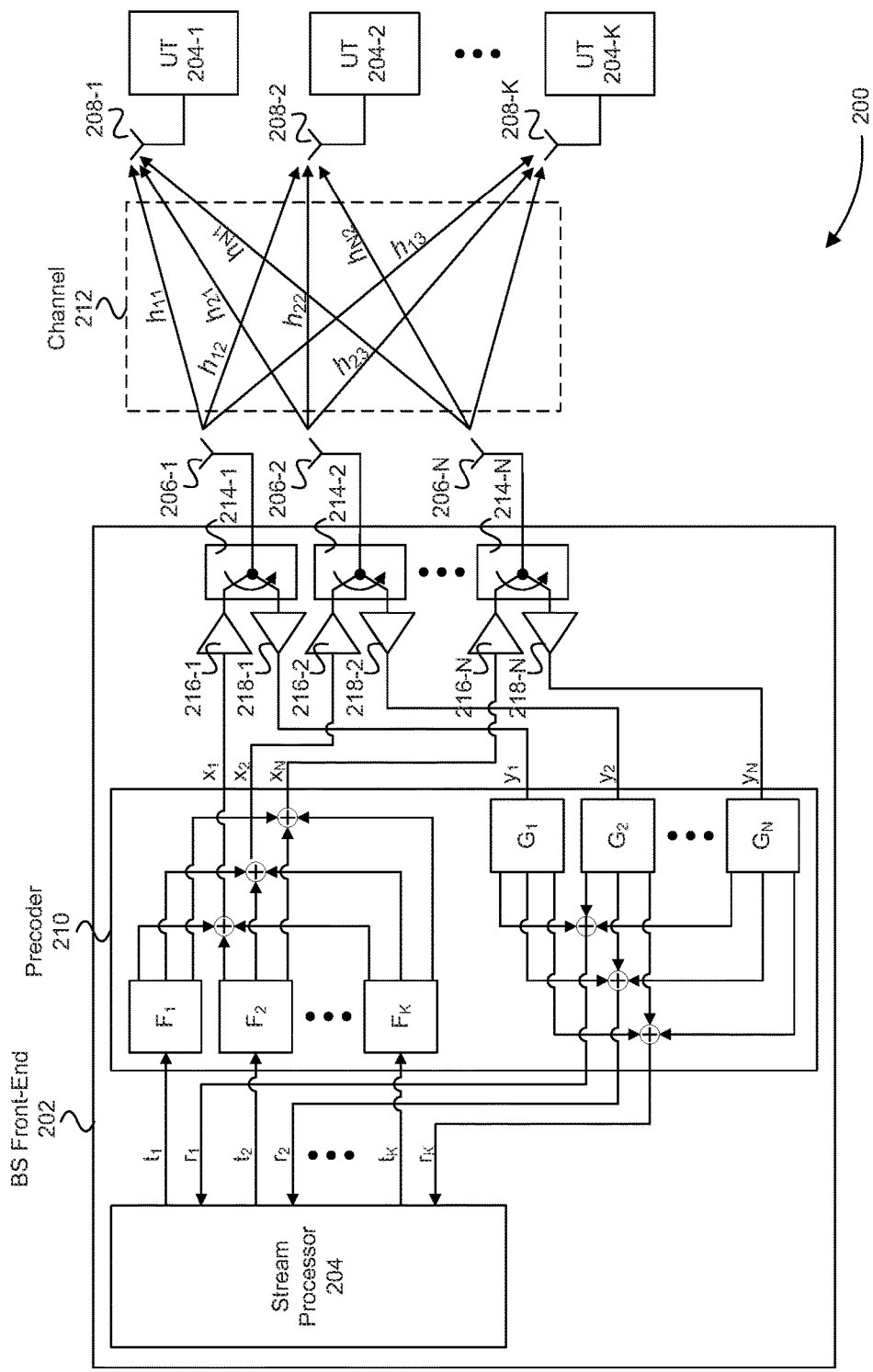
FIG. 2 illustrates a block diagram of an exemplary cellular communication system in accordance with embodiments of the present disclosure.

Referring now to FIG. 2, a block diagram of an exemplary cellular communication system 200 that includes a BS front-end 202 and multiple UTs 204-1 through 204-K is illustrated in accordance with embodiments of the present disclosure. BS front-end 202 can be, for example, implemented in BS 108 in FIG. 1, and UTs 204 can be the different UTs served by BS 108 in sector 102-1. In the exemplary embodiment of FIG. 2, BS front-end 202 includes N antennas 206-1 through 206-N, and UTs 204 each include a respective one of antennas 208-1 through 208-K.

In operation of cellular communication system 200, BS front-end 202 is configured to transmit an independent data stream to each UT 204 over the same time-frequency interval in accordance with a spatial multiplexing technique. BS front-end 202 specifically uses a precoder 210 to transmit precode the independent data streams before they are transmitted to reduce interference between them. Several different precoding techniques can be used, including matched-filter precoding, zero-forcing precoding, minimum-mean square error precoding, and, with some modifications to precoder 210, non-linear precoding techniques such as vector perturbation. In FIG. 2, the independent data streams to be transmitted to UTs 204 are labeled $t_1$ through $t_K$ and are provided to precoder 210 by a stream processor 204 (used to, for example, modulate/demodulate and upconvert/downconvert independent data streams transmitted and received by BS front-end 202).

The resulting signal vector output by precoder 210 can be written as:

$$x = \sum_{i=1 \text{ to } K} F_i t_i, \quad (1)$$

where $F_i$ is a $N \times L_i$ precoding vector of complex weights for the i-th UT (where N is the number of transmit antennas as BS front-end 202 and $L_i$ is the number of data streams to be sent to the i-th UT) and $t_i$ is a $L_i \times 1$ data vector for the i-th UT. Because each UT 204 has only one antenna in the exemplary embodiment of FIG. 2, $L_i$ is necessarily equal to one.

Based on the signal vector x being appropriately fed to and transmitted by the N antennas 206 at BS front-end 202, the signal received by the k-th UT can be written as:

$$z_k = H_k \cdot x + n_k, \quad (2)$$

$$= H_k \cdot \sum_{i=1 \text{ to } K} F_i t_i + n_k,$$

where $n_k$ is a vector representing noise, and $H_k$ is a M×N channel matrix for the k-th UT. Each entry in $H_k$ corresponds to a respective sub-channel (of channel 212) between a respective transmit antenna at BS front-end 202 and a respective receive antenna at the k-th UT. The number of columns N in $H_k$ is equal to the number of transmit antennas used at BS front-end 202, and the number of rows M in $H_k$ is equal to the number of receive antennas at the k-th UT, which in the example embodiment of FIG. 2 is again one for all UTs 204. To provide an example, the channel matrix $H_1$ for UT 204-1 is given by the vector $[h_{11}\ h_{21}\ \ldots\ h_{N1}]$.

It should be noted that BS front-end 202 can also (or alternatively) use antennas 206 to receive independent data streams over the same time-frequency interval from UTs 204. More specifically, BS front-end 202 can use antennas 206 in conjunction with receive precoding to appropriately weight and combine the signals received by each antenna to reduce interference between the independent data streams. The receive data stream vector output by precoder 210 can be written as:

$$r = \Sigma_{i=1\ to\ N} G_i Y_i, \quad (3)$$

where $G_i$ is a K×1 receive precoding vector of complex weights and $y_i$ is the i-th receive signal.

In one embodiment, BS front-end 202 communicates with UTs 204 in a time division duplexing manner and uses antennas 206 to both transmit and receive signals. In such an embodiment, RF switches 214-1 through 214-N can be used to respectively route transmit signals $x_1$ through $x_N$ to antennas 206 from the transmitter path of BS front-end 202 and route receive signals $y_i$ through $y_N$ from antennas 206 to the receive path of BS front-end 202, without allowing transmit signals $x_1$ through $x_N$ to pass directly to the receive path.

It should be noted that power amplifiers 216-1 through 216-N can be used to respectively amplify transmit signals $x_1$ through $x_N$ and low-noise amplifiers 218-1 through 218-N can be used to respectively amplify receive signals $y_i$ through $y_N$ as shown in FIG. 2.

III. Modular and Scalable Massive Mimo Architecture

Figure 3:
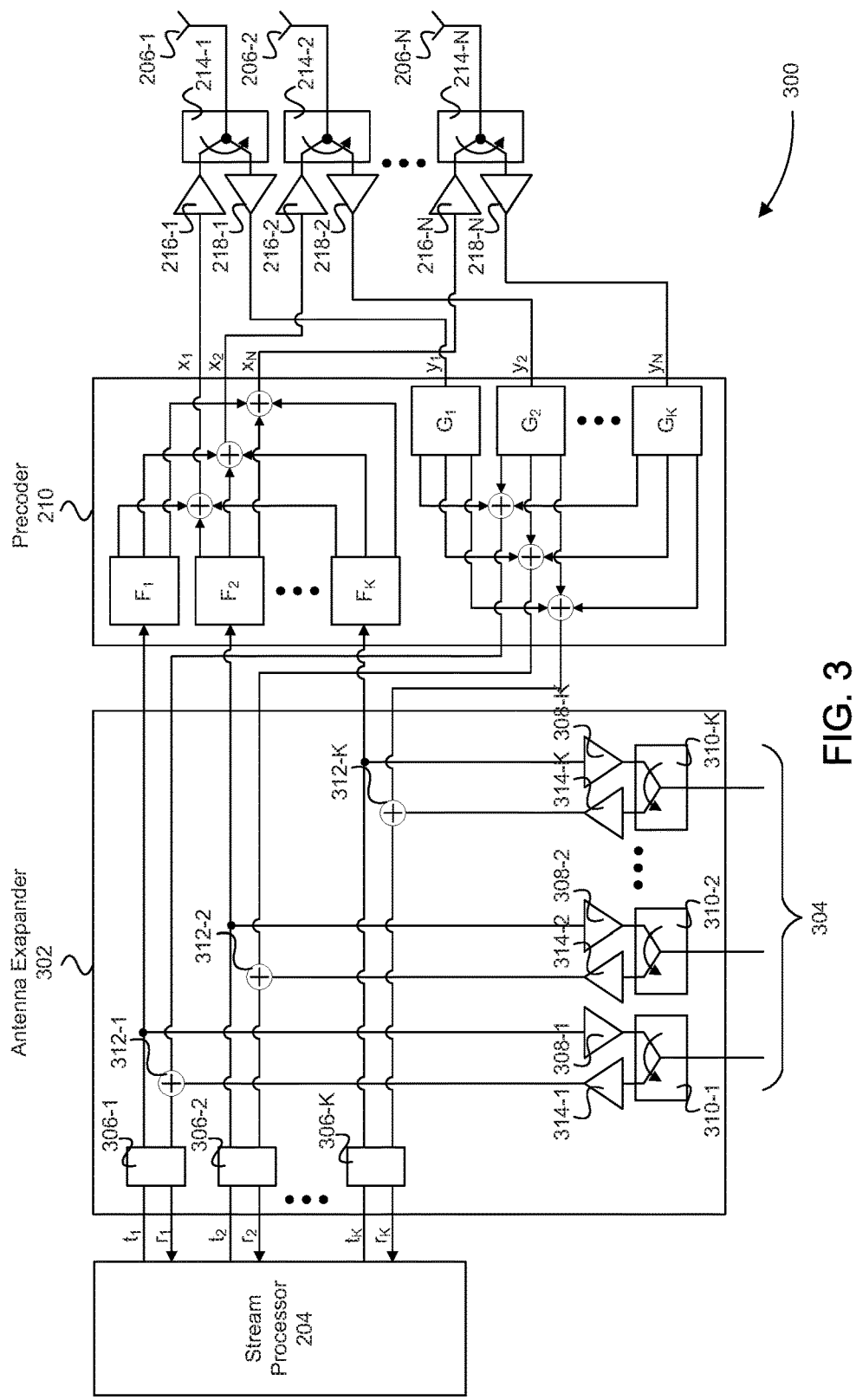
FIG. 3 illustrates a modular and scalable BS front-end in accordance with embodiments of the present disclosure.

Referring now to FIG. 3, a modular and scalable BS front-end 300 is illustrated in accordance with embodiments of the present disclosure. BS front-end 300 has the same structure and operates in the same manner as BS front-end 202 in FIG. 2 with the exception that BS front-end 300 further includes an antenna expander 302.

Antenna expander 302 allows the number of antennas used by the BS in which BS front-end 300 is implemented to be increased and decreased in a simple and cost efficient manner. More specifically, antenna expander 302 can be daisy chained to another BS front-end (not shown in FIG. 3) via input/output ports 304 of antenna expander 302. The two daisy chained BS front-ends can then function cooperatively to utilize the precoders and antennas of both BS front-ends to transmit data streams $t_1$-$t_K$ and/or receive data streams $r_1$-$r_K$.

More specifically, on the transmit side, antenna expander 302 can be configured to pass transmit data streams $t_1$-$t_K$ from stream processor 204 to both precoder 210 and input/output ports 304 of antenna expander 302. Precoder 210 can then precode the transmit data streams $t_1$-$t_K$ as described above with respect to FIG. 2 for transmission by antennas 206. Similarly, the precoder of the BS front-end daisy chained to input/output ports 304 can also precode the transmit data streams $t_1$-$t_K$ for transmission via its antennas, thereby increasing the total number of antennas used to transmit data streams $t_1$-$t_K$. The number of antennas used to transmit data streams $t_1$-$t_K$ can be decreased by simply removing the BS front-end daisy chained to input/output ports 304.

During each transmission time slot in a time division duplexing communication scheme, switches 306-1 through 306-k are configured to respectively couple transmit data streams $t_1$-$t_K$ to both precoder 210 and input/output ports 304. Transmit data streams $t_1$-$t_K$ are coupled to input/output ports 304 via optional power amplifiers 308-1 through 308-K and RF switches 310-1 through 310-K.

On the receive side, antenna expander 302 can be configured to receive two sets of "partially" receive precoded signals: a first set of partially receive precoded signals from precoder 210 and a second set of partially receive precoded signals from input/output ports 304. The sets of precoded signals are only partially receive precoded given that not all antennas, and thus not all receive signals, are available to either precoder 210 or the precoder of the BS front-end daisy chained to input/output ports 304. Antenna expander 302 can sum pairs of partially receive precoded signals using adders 312-1 through 312-K, where each pair includes a partially receive precoded signal from each set as shown in FIG. 3, to generate receive data streams $r_1$ through $r_k$.

During each receive time slot in a time division duplexing communication scheme, switches 306-1 through 306-k are configured to couple the resulting sums of the pairs of partially receive precoded signals, which are respectively equal to receive data streams $r_1$-$r_k$, to stream processor 304. The set of partial precoded signals from input/output ports 304 is received via optional low-noise amplifiers 314-1 through 314-K through RF switches 310.

Figure 4A:
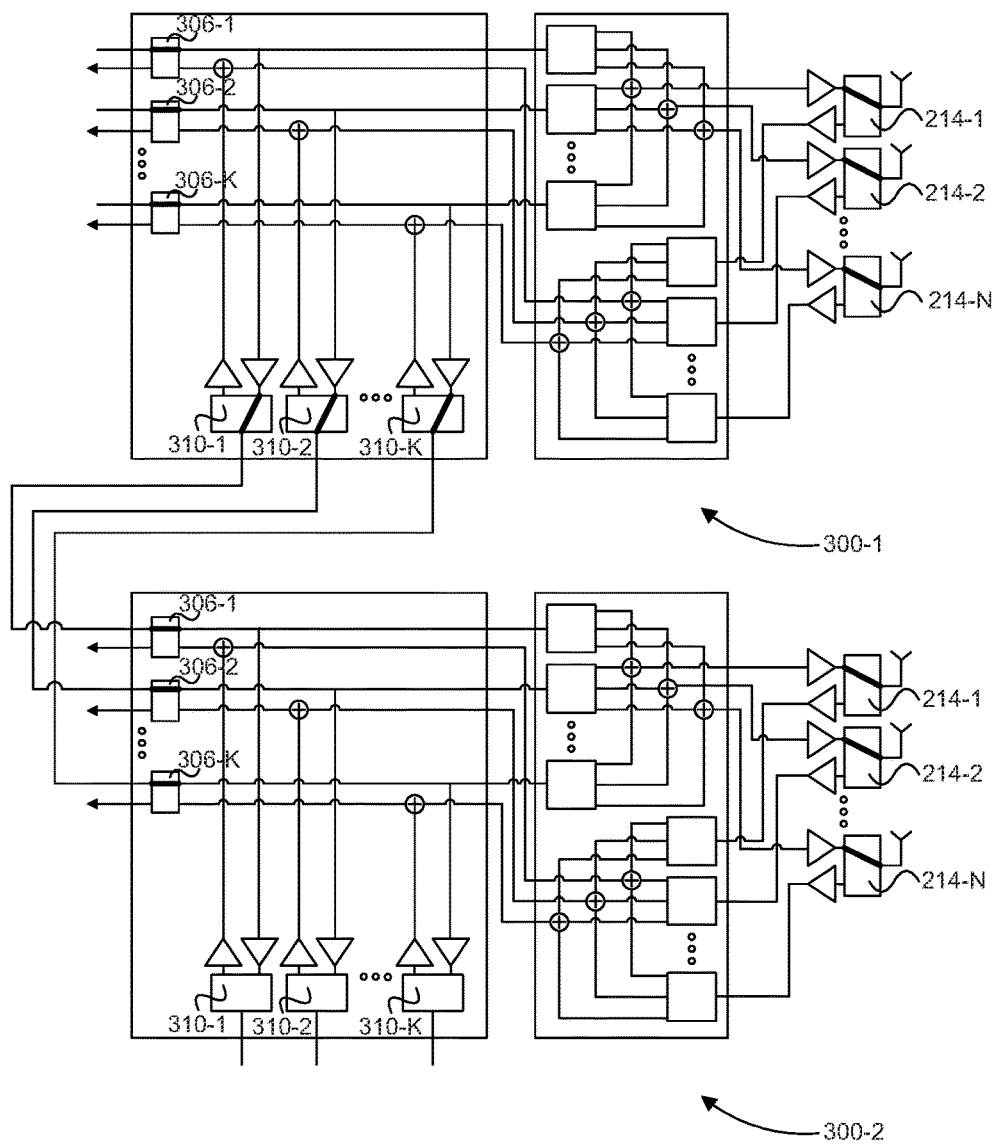
FIG. 4A illustrates two daisy chained BS front-ends operating during a transmit time slot in accordance with embodiments of the present disclosure.

To further illustrate the daisy chain concept, FIG. 4A illustrates two daisy chained BS front-ends 300-1 and 300-2 operating during a transmit time slot in accordance with embodiments of the present disclosure. Each BS front-end 300-1 and 300-2 has the same configuration as BS front-end 300 in FIG. 3. However, for clarity purpose, reference numbers for components of BS front-ends 300-1 and 300-2 have been omitted, with the exception of RF switches, 214, 306, and 310. FIG. 4A illustrates the connections that RF switches 214, 306, and 310 are configured to make during a transmit time slot. It should be noted that additional BS front-ends can be further daisy chained off of BS front-end 300-2 to further increase the number of antennas used to transmit data streams $t_1$-$t_K$ as would be appreciated by one of ordinary skill in the art based on the teachings herein.

Figure 4B:
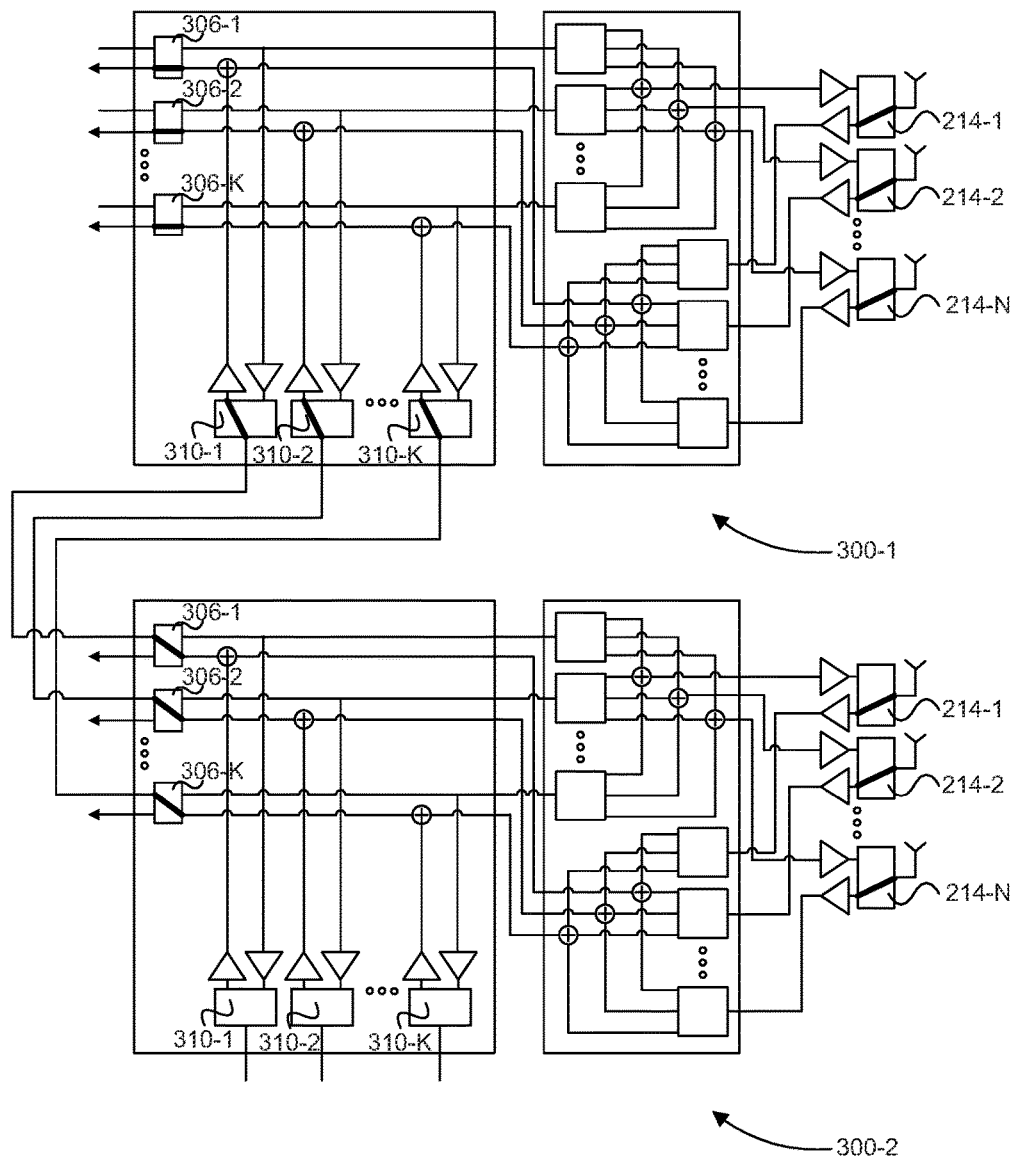
FIG. 4B illustrates two daisy chained BS front-ends operating during a receive time slot in accordance with embodiments of the present disclosure.

FIG. 4B illustrates two daisy chained BS front-ends 300-1 and 300-2 operating during a receive time slot in accordance with embodiments of the present disclosure. Each BS front-end 300-1 and 300-2 has the same configuration as BS front-end 300 in FIG. 3. However, for clarity purpose, reference numbers for components of BS front-ends 300-1 and 300-2 have again been omitted, with the exception of RF switches, 214, 306, and 310. FIG. 4B illustrates the connections that RF switches 214, 306, and 310 are configured to make during a receive time slot. It should be noted that additional BS front-ends can be further daisy chained off of BS front-end 300-2 to further increase the number of antennas used to receive data streams $r_1$-$r_K$ as would be appreciated by one of ordinary skill in the art based on the teachings herein.

Figure 5:
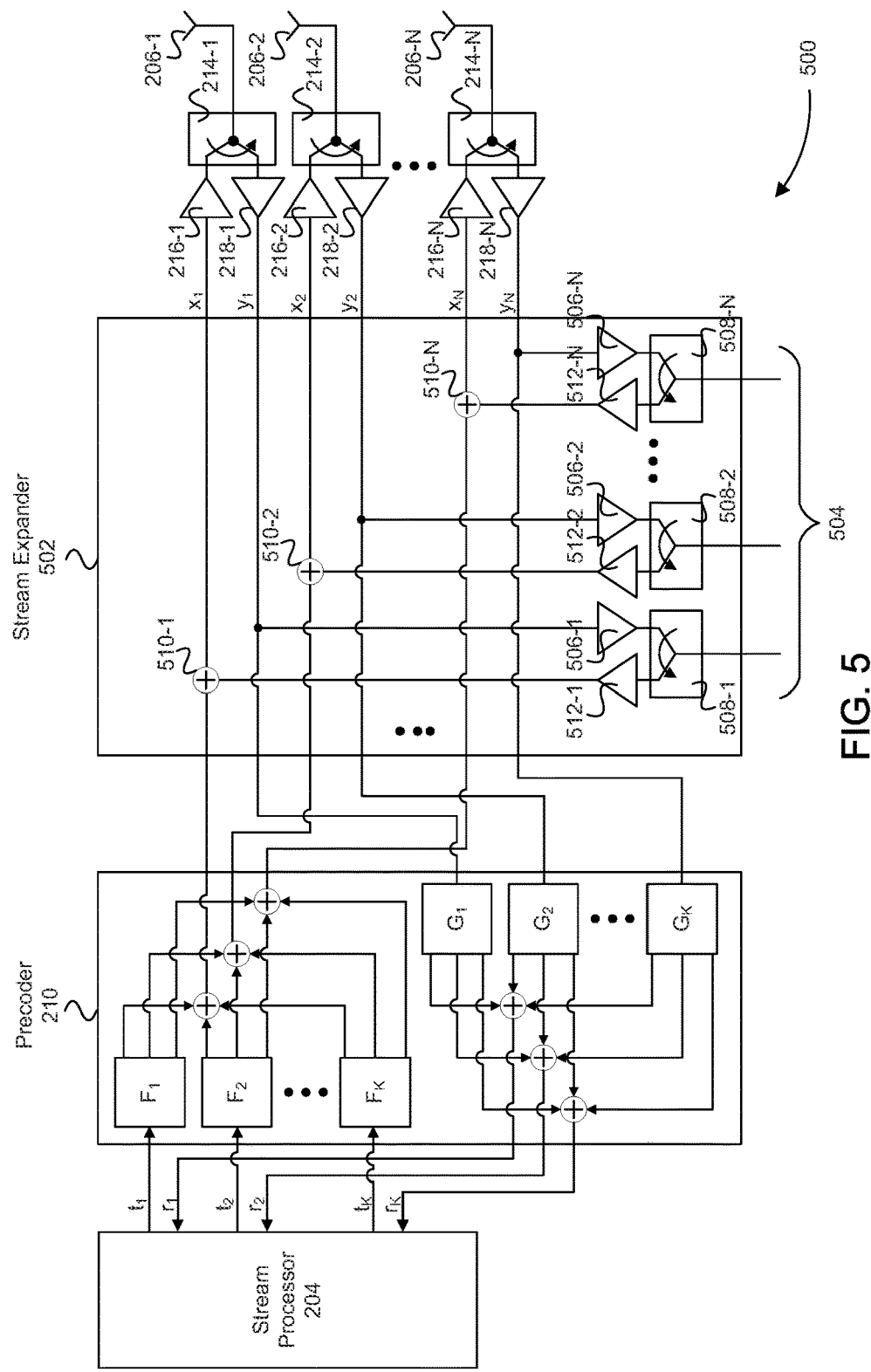
FIG. 5 illustrates a modular and scalable BS front-end in accordance with embodiments of the present disclosure.

Referring now to FIG. 5, a modular and scalable BS front-end 500 is illustrated in accordance with embodiments of the present disclosure. BS front-end 500 has the same structure and operates in the same manner as BS front-end 202 in FIG. 2 with the exception that BS front-end 300 further includes a stream expander 502.

Stream expander 502 allows the number of data streams transmitted and/or received by the BS in which BS front-end 500 is implemented to be increased and decreased in a simple and cost efficient manner. More specifically, stream expander 502 can be daisy chained to another BS front-end (not shown in FIG. 5) via input/output ports 504 of stream expander 502. The two daisy-chained BS front-ends can then function cooperatively to utilize the precoders of both BS front-ends to transmit additional transmit data streams (i.e., transmit data streams in addition to transmit data streams $t_1$-$t_K$) and receive additional receive data streams (i.e., receive data streams in addition to receive data streams $r_1$-$r_K$).

More specifically, on the receive side, stream expander 502 can be configured to pass receive signals $y_1$-$y_N$ received from antennas 206 to both precoder 210 and input/output ports 504 of stream expander 502. Precoder 210 can then receive precode the receive signals $y_1$-$y_N$ as described above with respect to FIG. 2 to generate receive data streams $r_1$-$r_K$. Similarly, the precoder of the BS front-end daisy chained to input/output ports 504 can also receive precode the receive signals $y_1$-$y_K$ to recover an additional set of receive data streams, thereby increasing the total number of receive data streams.

During each receive time slot in a time division duplexing communication scheme, receive signals $y_1$-$y_K$ are coupled to input/output ports 504 via optional power amplifiers 506-1 through 506-N and RF switches 508-1 through 508-N.

On the transmit side, stream expander 502 can be configured to receive two sets of "partially" transmit precoded signals: a first set of partially transmit precoded signals from precoder 210 and a second set of partially transmit precoded signals from input/output ports 504. The sets of precoded signals are only partially transmit precoded given that not all data streams are available to either precoder 210 or the precoder of the BS front-end daisy chained to input/output ports 504. Stream expander 502 can sum pairs of partially transmit precoded signals using adders 510-1 through 510-N, where each pair includes a partially transmit precoded signal from each set as shown in FIG. 5, to generate transmit signals $x_1$-$x_N$.

During each transmit time slot in a time division duplexing communication scheme, switches 508 are configured to couple the partially transmit precoded signals from input/output ports 304 to adders 510 via optional low-noise amplifiers 512-1 through 512-K.

Figure 6A:
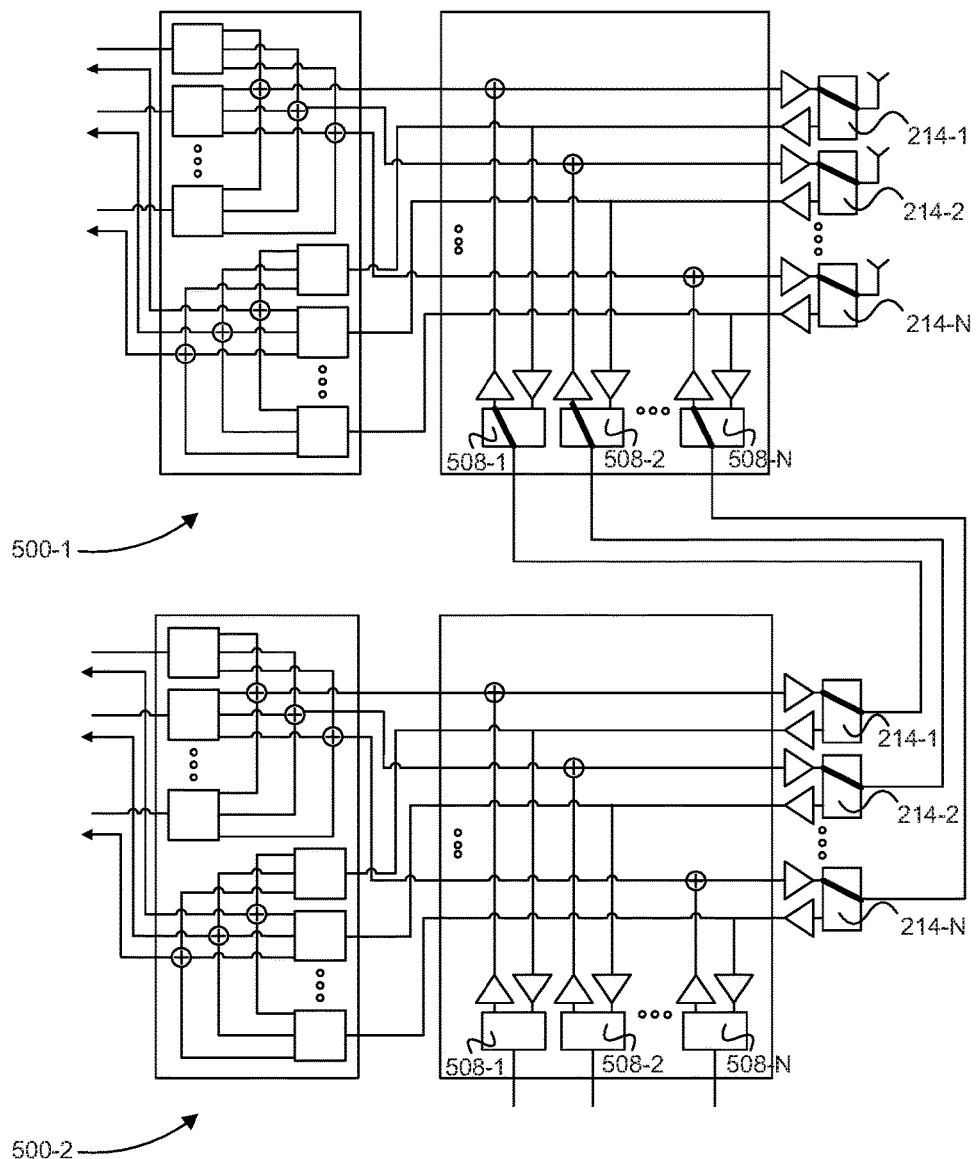
FIG. 6A illustrates two daisy chained BS front-ends operating during a transmit time slot in accordance with embodiments of the present disclosure.

To further illustrate the daisy chain concept, FIG. 6A illustrates two daisy chained BS front-ends 500-1 and 500-2 operating during a transmit time slot in accordance with embodiments of the present disclosure. Each BS front-end 500-1 and 500-2 has the same configuration as BS front-end 500 in FIG. 5. However, for clarity purpose, reference numbers for components of BS front-ends 500-1 and 500-2 have been omitted, with the exception of the RF switches 214 and 508. FIG. 6A illustrates the connections that RF switches 214 and 508 are configured to make during a transmit time slot. It should be noted that additional BS front-ends can be further daisy chained off of BS front-end 500-2 to further increase the number of transmit and receive data streams as would be appreciated by one of ordinary skill in the art based on the teachings herein.

Figure 6B:
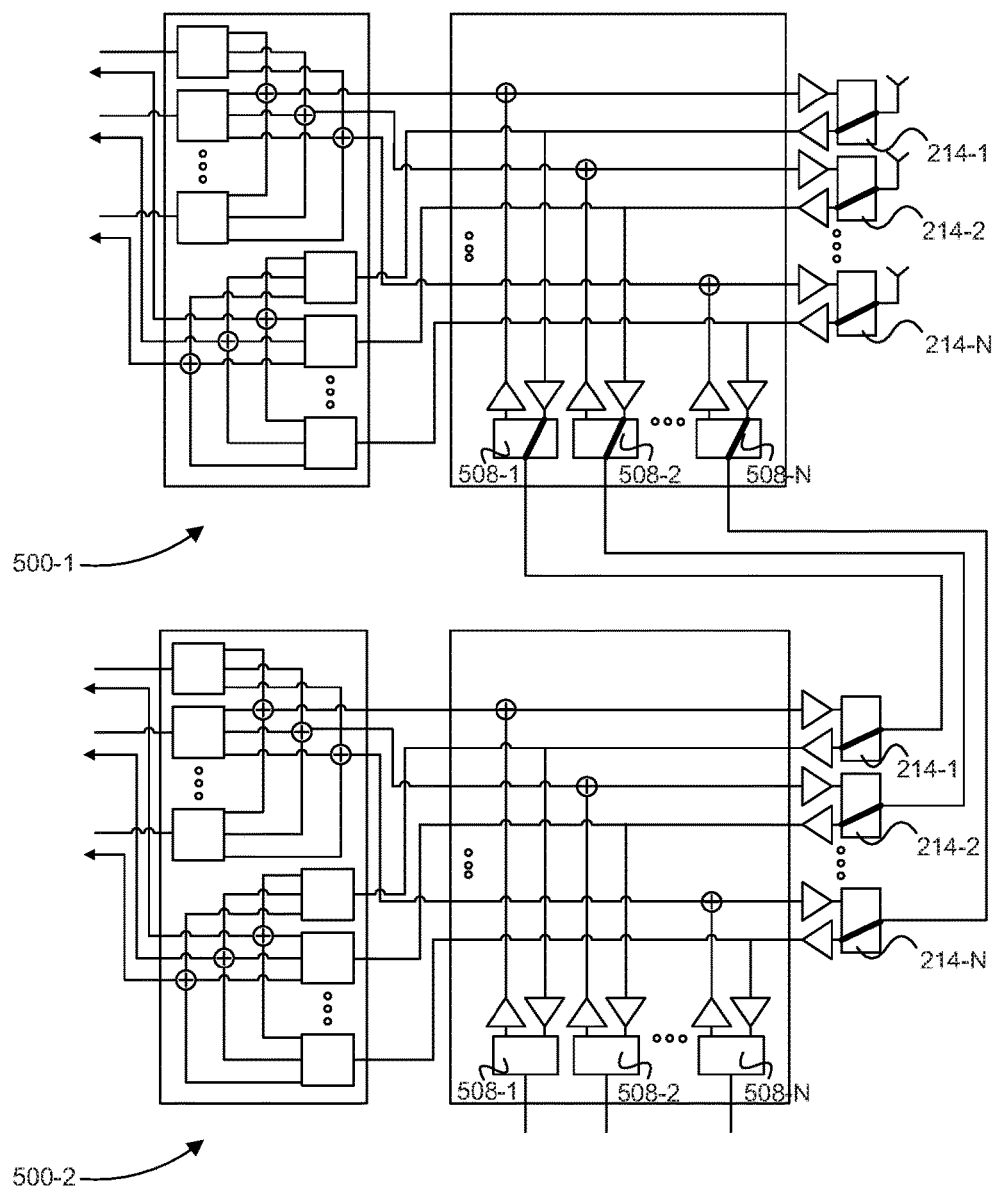
FIG. 6B illustrates two daisy chained BS front-ends operating during a receive time slot in accordance with embodiments of the present disclosure.

FIG. 6B illustrates two daisy chained BS front-ends 500-1 and 500-2 operating during a receive time slot in accordance with embodiments of the present disclosure. Each BS front-end 500-1 and 500-2 has the same configuration as BS front-end 500 in FIG. 5. However, for clarity purpose, reference numbers for components of BS front-ends 500-1 and 500-2 have been omitted, with the exception of the RF switches 214 and 508. FIG. 6B illustrates the connections that RF switches 214 and 508 are configured to make during a receive time slot. It should be noted that additional BS front-ends can be further daisy chained off of BS front-end 500-2 to further increase the number of transmit and receive data streams as would be appreciated by one of ordinary skill in the art based on the teachings herein.

It should be noted that antenna expander 302 and stream expander 502 can be implemented in the same BS front-end 300. Such an implementation can allow full flexibility in terms of scaling the number of antennas and the number data streams transmitted and/or received by the BS implementing the BS front-end 300.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software. For example, precoder 210 can be implemented in hardware using hardware based multipliers and adders, in software through execution of instructions by one or more general purpose or special-purpose processors for performing multiplication and addition operations, or as a combination of such hardware and software.

IV. Phased Array Antenna with Self-Beam Pattern Formation

Phased array antennas at uWave and mmWave bands are becoming very popular for existing and near future applications like 5G (next generation mobile technology). Due to the high link loss at uWave and mmWave, antennas at these bands typically have high gain, and therefore include hundreds of antenna elements.

One challenge in using these phased array antennas is the estimation of received signal direction and channel conditions. These estimations are necessary to form an optimal antenna beam pattern. As the uWave/mmWave high gain antennas consist of hundreds of elements, it can be impractical to have digital receiver chain behind each element to allow the optimal estimation (as done in sub 6 GHz antennas).

One approach to overcome this challenge is to combine several antenna elements per digital receiver chain. Although this solution has a reasonable implementation complexity, it does not leverage the reach information available at all the antenna elements.

Embodiments of the present disclosure include an antenna with self-beam pattern formation capabilities. On antenna phase shifters are configured to introduce an optimal or improved antenna beam pattern under current received signal and channel conditions. This configuration can reduce cost via lower implementation complexity and reduce processing needs. An additional benefit is high tolerance to low-cost, low-accuracy on-antenna phase shifters due to the closed loop nature of the algorithm. Further details can be found in U.S. Provisional Patent Application No. 62/324, 737, filed Apr. 19, 2016, which is incorporated by reference herein.

V. Direct Pattern Beam Forming for Mu-Mimo Antennas

Multi User Massive MIMO antennas at uWave and mmWave bands are becoming very popular for existing and near future applications like 5G (next generation mobile technology). Due to the high link loss at uWave and mmWave, antennas at these bands typically introduce very high gain. Thus, the antennas typically include of hundreds of antennas. In addition, these kinds of antennas transmit several data streams simultaneously on the same frequency with spatial separation.

To address the above requirements, a complex antenna beam pattern is needed. This complex beam pattern is recalculated hundreds of times per second to track the fast changes in the channel's conditions and the users' locations. Per each beam pattern construction, powerful signal processing is followed by the configuration of hundreds of phase shifters.

In order to increase the configuration efficiency of the hundreds of phase shifters, a look up table (LUT) can be used. However, given the infinite beam patterns options and the large number of phase shifters, this approach can be insufficient.

Embodiments of the present disclosure allow direct pattern beam forming through phase shifter configurations for MU-Massive MIMO antennas. The beam pattern construction and the phase shifter configurations are performed at the same time or initiated at the same time based on voltage level controls. This technology supports complex beam patterns, including null steering and non-line of sight channels (multi rays beam). Further details can be found in U.S. Provisional Patent Application No. 62/324,737, filed Apr. 19, 2016, which is incorporated by reference herein.

VI. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments.

What is claimed is:

1. A modular base station front-end comprising:
a precoder;
an antenna expander configured to pass, to the precoder and to a plurality of input/output ports of the antenna expander, a plurality of transmit data streams from a stream processor; and
a stream expander configured to pass, to an antenna array, a plurality of transmit signals, wherein each transmit signal of the plurality of transmit signals is constructed from one or more of a plurality of partially transmit precoded signals from the precoder and one or more of a plurality of partially transmit precoded signals from a plurality input/output ports of the stream expander, and wherein the plurality of partially transmit precoded signals from the plurality of input/output ports of the stream expander are received from an additional modular base station front-end, and
wherein the precoder is configured to transmit precode the plurality of transmit data streams to generate the plurality of partially transmit precoded signals from the precoder.

2. The modular base station front-end of claim 1, wherein the plurality of input/output ports of the antenna expander are coupled to an additional modular base station front-end.

3. The modular base station front-end of claim 1, wherein the precoder is configured to transmit precode the plurality of transmit data streams to perform spatial multiplexing.

4. The modular base station front-end of claim 1, wherein the plurality of transmit signals are intended to be received by multiple user terminals.

5. The modular base station front-end of claim 1, wherein the plurality of transmit signals are intended to be received by a single user terminal.

6. The modular base station front-end of claim 1, wherein the precoder is configured to transmit precode the plurality of transmit data streams to perform beamforming to a single user terminal.

7. The modular base station front-end of claim 1, wherein each of the plurality of input/output ports of the antenna expander is coupled to a respective one of the plurality of transmit data streams via a switch.

8. The modular base station front-end of claim 1, wherein the stream processor is configured to perform modulation to generate the transmit data streams.

* * * * *